United States Patent

[11] 3,625,637

| [72] | Inventors | Jozef Kiwalle;<br>Ira H. Sage, both of Peoria, Ill. |
|---|---|---|
| [21] | Appl. No. | 27,903 |
| [22] | Filed | Apr. 13, 1970 |
| [45] | Patented | Dec. 7, 1971 |
| [73] | Assignee | Caterpillar Tractor Co.<br>Peoria, Ill. |

[54] CONVERSION OF VARIABLE DELIVERY PUMP TO FIXED DELIVERY PUMP
5 Claims, 2 Drawing Figs.

[52] U.S. Cl. .................................................. 417/218,
60/52 VS, 91/506
[51] Int. Cl. .................................................. F04b 49/00
[50] Field of Search ........................................ 417/212,
218; 91/506; 60/52 VS

[56] References Cited
UNITED STATES PATENTS

| 2,114,445 | 4/1938 | Gros ............................... | 74/839 |
| 3,139,006 | 6/1964 | Budzich .......................... | 91/506 |
| 3,017,750 | 1/1962 | Kempson ........................ | 417/218 |

Primary Examiner—Carlton R. Croyle
Assistant Examiner—Richard J. Sher
Attorney—Fryer, Tjensvold, Feix, Phillips & Lempio

ABSTRACT: A variable delivery fluid pump and a variable delivery fluid motor are used to accelerate the spindle of an inertia welding machine to the welding speed, and the pump is then converted to a fixed delivery pump in order to provide a nonfluctuating pressure to power the thrust cylinders for application of the welding pressure.

PATENTED DEC 7 1971 3,625,637
SHEET 1 OF 2
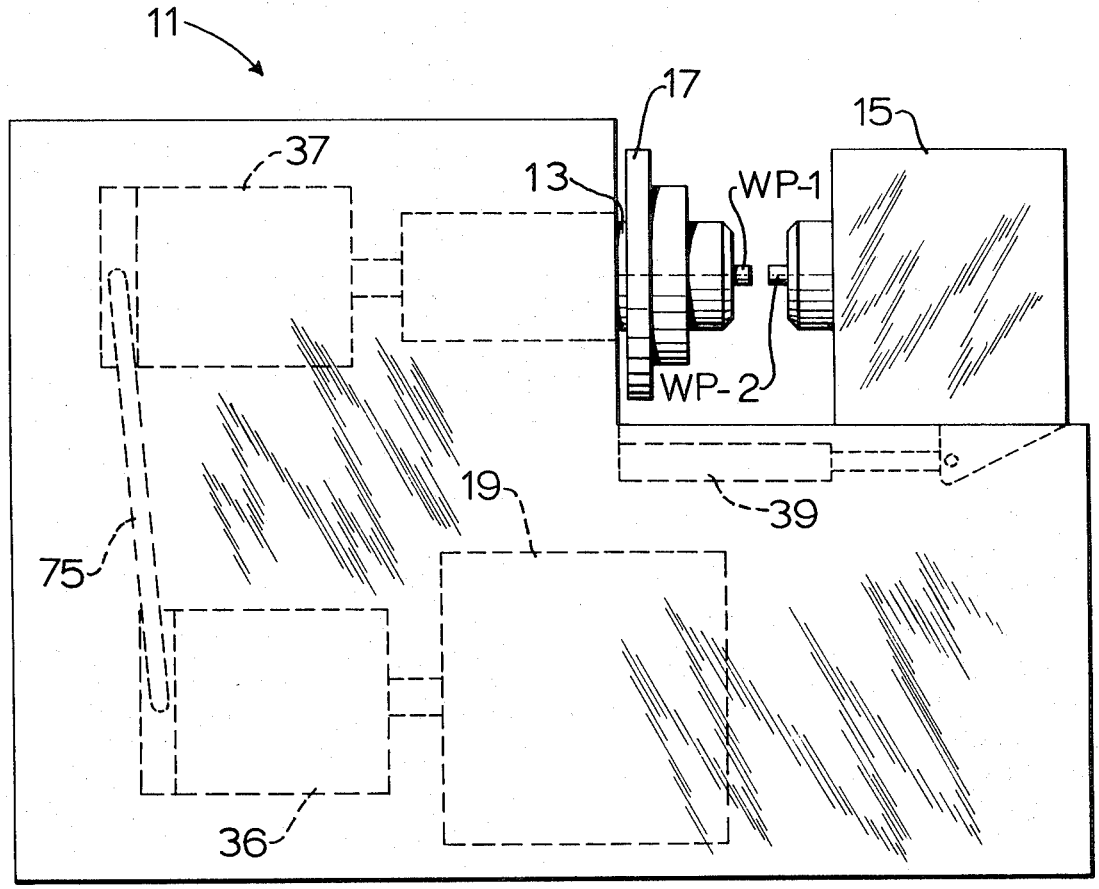
Fig_1_
INVENTORS
Jozef Kiwalle
Ira H. Sage
BY
Fryer, Tjensvold, Feix, Phillips & Lempio
ATTORNEYS

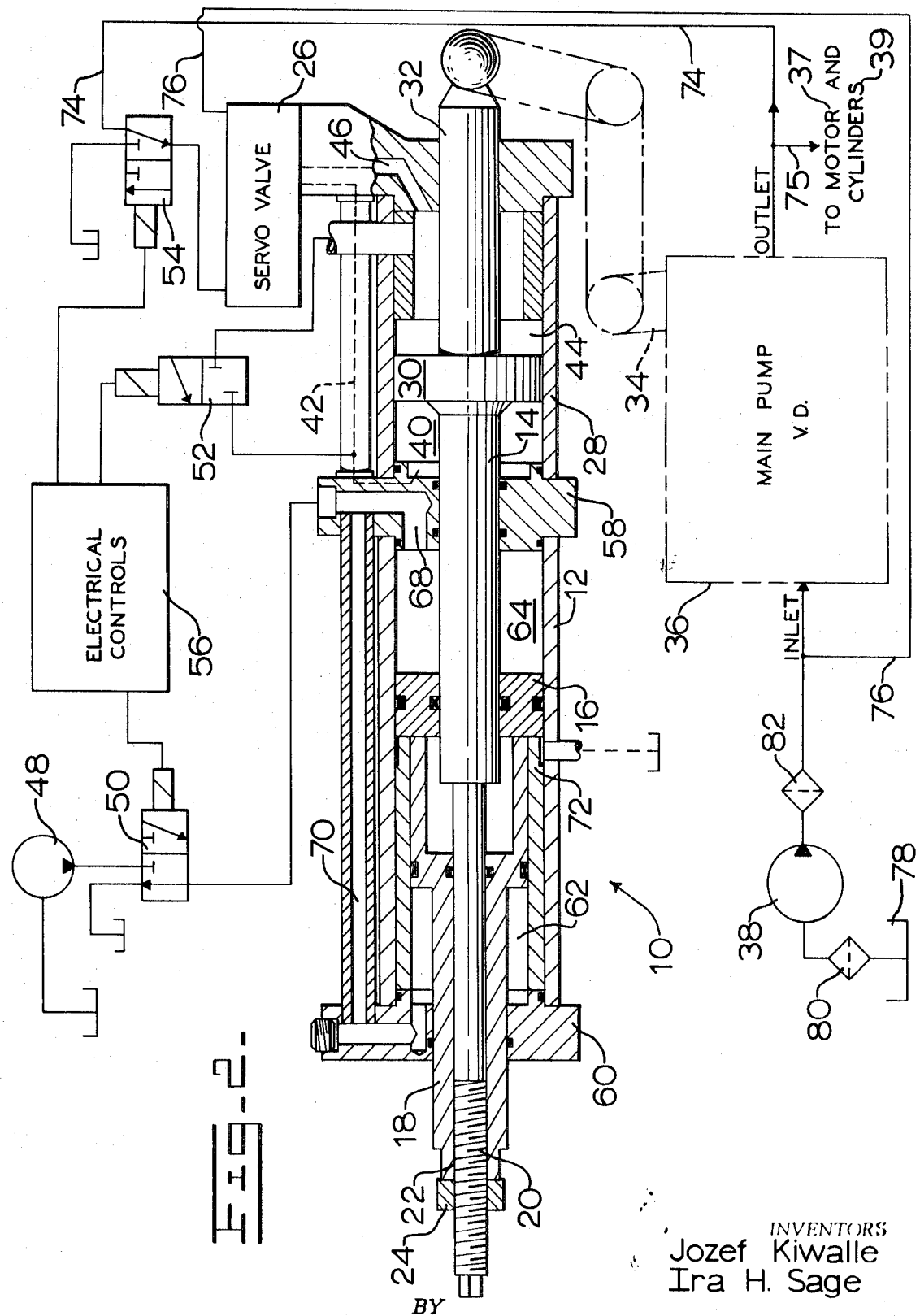

CONVERSION OF VARIABLE DELIVERY PUMP TO FIXED DELIVERY PUMP

This invention relates to a control for a hydraulic pump of the kind in which the displacement of the pump is varied by changing the angular position of a wobble plate. This invention relates specifically to a control mechanism which functions to convert the variable delivery pump to a fixed delivery pump on a temporary basis.

The present invention has particular utility in an inertia friction welding machine. In an inertia friction welding machine the energy for producing the weld is stored in a rotating flywheel which is accelerated to a selected rotational speed before the parts to be welded are engaged in rubbing contact.

In the present invention the flywheel is driven by a hydraulic motor.

The parts to be welded are pressed together by a hydraulically actuated thrust cylinder.

A variable displacement hydraulic pump drives the hydraulic motor.

After the flywheel has been accelerated to speed, the pump is connected to the thrust cylinder to produce the welding pressure.

A variable displacement pump is well suited for accelerating the flywheel, but is not entirely satisfactory as the power source for the thrust cylinders. The variable displacement pump presents problems of pressure fluctuations resulting from the variable displacement feature of the fluid pump.

The problems of pressure fluctuations occuring during the thrust load application have been severe enough to cause fixed displacement pumps to be used in prior art machines. However a fixed displacement pump contributes a problem of its own—low efficiency due to long acceleration times.

It is a primary object of the present invention to control the displacement of a variable displacement pump in a manner such that the pump can be operated as a variable displacement pump in one condition of operation and as a fixed displacement pump in a second condition of operation.

It is a related object to convert a variable displacement fluid pump to a fixed displacement pump during the second condition of operation by physically locking the wobble plate of the pump in a predetermined position during the second condition of operation.

In accordance with the present invention the conversion means for converting the variable delivery fluid pump to a fixed delivery fluid pump include the following specific items: A fluid locking cylinder; a floating piston within the cylinder; a second piston within the cylinder adjustable within the cylinder in relation to the desired delivery position of the pump piston; a rod within the cylinder and within the second piston securely fastened on one end to the second piston and in abutting relationship to the variable displacement pump servo piston on the other end, and means to adjust the rod within the cylinder and within the second piston; valve control means to direct fluid to both ends of the locking cylinder at the same time, and separate valve means to direct fluid to both ends of the cylinder controlling pump displacement, electrical control means to activate both of the above valve control means at the same time; and a fixed delivery fluid pump to supply fluid to the locking cylinder through the valve means described above.

A control for a hydraulic pump which incorporates the above noted features and effective to function in the manner described constitute further specific objects of the present invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

IN THE DRAWINGS

FIG. 1 is a side elevation view of a friction welder constructed in accordance with one embodiment of the present invention; and FIG. 2 is a schematic view of a control constructed in accordance with one embodiment of the present invention and which can be used to convert a variable delivery pump to a fixed delivery pump in the friction welder shown in FIG. 1.

An inertia friction welding machine constructed in accordance with one embodiment of the present invention is indicated generally by the reference numeral 11 in FIG. 1.

The parts or workpieces to be welded by the friction welding machine 11 are indicated by the reference characters WP1 and WP2 in FIG. 1.

The part WP1 is held in a chuck on a rotatable spindle 13.

The part WP2 is held in a chuck in a nonrotatable fixture 15.

The energy for producing the weld is stored in a rotating flywheel 17 mounted on the spindle 13.

Loading means, in the form of one or more thrust cylinders 39, move the fixture 15 towards the rotating spindle 13 after the flywheel 17 has been accelerated to the selected speed. The loading means cause the parts WP1 and WP2 to be pressed together in rotating rubbing contact to produce the welding pressure.

An electric motor 19 drives a hydraulic pump 36 to supply the power both for accelerating the flywheel to the selected rotational speed and for actuating the thrust cylinders 39 to provide the welding pressure.

The pump 36 is connected to a hydraulic motor 37 by a conduit 75 as shown in FIG. 1. The output of the pump 36 is also connected to the thrust cylinder 39.

The friction welding machine 11 incorporates an automatic control which directs the output of the pump 36 to the motor 37 until flywheel 17 is accelerated to speed and which then directs the output of the pump to the thrust cylinder 39.

The pump 36 is basically a variable displacement pump of the kind in which the displacement is varied by changing the angular position of a wobble plate in the pump.

As noted above, it is desirable that the pump 36 function as a variable delivery pump during the time the output of the pump is being delivered to the motor 37 to accelerate the flywheel 17 to speed and then function as a fixed displacement pump during the time that the output of the pump is directed to the thrust cylinder 39 for producing the welding pressure.

FIG. 2 illustrates in section the essential elements for converting a variable delivery fluid pump to a fixed delivery fluid pump. FIG. 2 also includes some controls and elements in schematic form.

The conversion assembly 10 includes a cylinder 12, an adjustable stop shaft 14, a floating piston 16, and a fixed piston 18.

The stop shaft 14 and the fixed piston 18 are fastened together by means of threads 20 and 22 and are held in any given position by a lock nut 24.

A portion of the variable displacement pump controls is also shown in FIG. 2 and although not forming a portion of the conversion assembly, they are used in conjunction with the conversion assembly to accomplish the desired result. These controls include a servo and pressure compensating valve 26, a servo pressure cylinder 28, a servo piston 30, and a wobble plate rod 32 fastened at one end to the servo piston.

The wobble plate rod 32 is pivotally fastened at the other end to the wobble plate (shown in phantom line detail) which is used to change the displacement of the variable displacement fluid pump 36 (also shown in phantom line detail).

In the normal mode of operation of the variable delivery pump and controls (without the conversion assembly 10), a small constant delivery pump 38 delivers pressurized fluid to the servo and pressure compensating valve 26 by means of line 76. The servo valve then activates the servo piston 30 by sending fluid to chamber 40 thru line 42 or to chamber 44 thru line 46, depending on the high pressure signal which the servo valve is receiving from the main pump 36. The high pressure signal reflects the output pressure of pump 36 and reaches the servo valve 26 by means of line 74 and control valve 54. Movement of the servo piston 30, of course, changes the displacement of the variable delivery pump 36 so that a delivery rate is produced in proportion to the demand from the system.

The small pump 38 also supplies fluid from tank 78 to the main pump 36. The fluid is cleaned by means of filters 80 and 82.

Besides the assembly 10 previously described, the conversion unit will include several other items for operation and control of the conversion assembly. These include a small constant delivery clamp pump 48, a control valve 50 between pump 48 and the assembly 10, a control valve 52, and a control valve 54 between main pump 36 and the servo valve 26.

Besides providing power to operate the assembly 10, the small pump 48 can be used to operate other machine functions which require small fluid delivery.

The control valves 50, 52, and 54 are all connected to the electrical controls 56 of the machine and are automatically operated by such controls when the spindle of the welding machine reaches a predetermined and preset rotational velocity. However, override controls will be provided to operate the conversion assembly manually if so desired.

To convert the variable delivery pump to a fixed delivery pump, the cylinder 28 of the servo assembly is altered to receive the conversion assembly 10 including the cylinder 12 which is sealed at each end by caps 58 and 60. Cap 58 also serves to seal chamber 40 of servo cylinder 28.

The adjustable stop shaft 14 is mounted for horizontal movement within the cylinder 12 and penetrates the end cap 58 in order to fasten to the servo piston 30 of the servo cylinder 28.

During the initial stages of the inertia weld cycle, the conversion assembly 10 and related controls are inactive and influence in no way the normal functions of the variable delivery pump 36 including the servo and pressure compensating valve 26. The pump 36 therefore operates to deliver a varying quantity of fluid in response to the signal from the servo valve 26, and piston 30 moves to the right or left within cylinder 28 in response to the servo valve 26 to change the displacement of the pump 36 by means of the wobble plate 34.

Although the adjustable stop shaft 14 is attached to the piston 30, no force is applied to the shaft 14 at this time and piston 30 can merely move the shaft 14 to the left if the servo piston 30 is signaled to move in that direction by the servo valve 26.

Since the adjustable shaft 14 is fastened to piston 18 as previously mentioned, any movement of the shaft 14 will cause the piston 18 to move also; and likewise, any movement of piston 18 will cause movement of shaft 14.

During the early stages of the acceleration cycle, piston 18 is free to move within chamber 62 of the cylinder 12, and piston 16 is also free to move within chamber 64 of the cylinder 12.

When the spindle of the welding machine reaches the predetermined welding velocity, the variable delivery controls of the pump 36 are disabled and the conversion assembly 10 takes over to make the pump, in effect, a constant delivery pump. To do this, a speed switch assembly signals the electrical controls when the spindle reaches the welding velocity; and the electrical controls 56 in turn signal control valves 50, 52, and 54 to shift to a new position.

Control valve 54 therefore closes off the high pressure signal from pump 36 to the servo valve 26, and control valve 52 merely opens communication between chamber 40 and chamber 44 of cylinder 28. This equalizes the pressure in chambers 40 and 44 and allows the piston 30 to be shifted to any position within the cylinder by the shaft 14.

Shifting of valve 50 allows the pump 48 to be communicated to the cylinder 12 through line 66, and pressurized fluid enters chambers 62 and 64 of cylinder 12 by means of passages 68 and 70.

Pressurized fluid will force the floating piston 16 to the left against the fixed stop member 72 and will also force the piston 18 to the right against the floating piston 16.

Since the area of piston 16 under pressure is greater than the area of piston 18 under pressure, the piston 16 will be held against the stop 72; and piston 18 will be held against piston 16 as long as pressure remains in chambers 62 and 64.

Since shaft 14 is fastened to the piston 18, the position of shaft 14 (and therefore the position of servo piston 30) is fixed in a predetermined position. This also predetermines the displacement of fluid being delivered by the pump 36. The position of piston 30 (and therefore the quantity of oil being delivered by pump 36 in a fixed delivery position) can be altered by threading shaft 14 either in or out of the piston member 18 as previously described. This is, however, a manual adjustment and must be accomplished before the welding operation begins.

Once the position and rate of delivery is determined, the piston 18 and shaft 14 are locked in the desired position by the locknut 24.

At the same moment that the pump 36 is converted from a variable delivery pump to a fixed delivery pump, flow of fluid from pump 36 to the spindle motor is discontinued; and flow is communicated to the welding thrust cylinder of the welding machine. The welding thrust cylinder can then apply a constant nonfluctuating force to the weld pieces in order to accomplish a good weld.

If the variable delivery pump is used to supply power to the thrust cylinder without the use of a conversion unit, the force applied to the thrust cylinders by the pump fluctuates and gives an erratic pressure application which in turn causes a poor weld.

At the end of the completed weld cycle, the speed sensing unit will signal the electrical controls that the spindle has stopped and the electrical controls 56 will in turn signal control valves 50, 52 and 54 to shift to their original positions. This will close off communication between pump 48 and cylinder 12, and reopen the high pressure signal communication between pump 36 and servo valve 26.

At the same time, the flow path between chambers 40 and 44 is closed off by valve 52.

The conversion assembly 10 therefore becomes inactive and the pump controls for the variable displacement pump 36 become active. The conversion assembly 10 and related controls remain inactive until once again it is desirable to convert the variable delivery pump 36 to a fixed delivery pump. As was described, this is accomplished at the time the thrust pressure is applied to the weld pieces. However, there are other operations of the welding machine, such as operating special types of clamping fixtures, where a fixed delivery from pump 36 would be more desirable than a variable delivery. The conversion assembly 10 can therefore be used for these purposes as well as for converting at the time of axial thrust application.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

What is claimed is:

1. A control for a hydraulic pump of the kind in which the displacement of the pump is varied by changing the angular position of a wobble plate and comprising, a hydraulic servomotor including a servo piston connected to the wobble plate, said servomotor having a fluid pressure chamber on each side of the servo piston, servomotor control means responsive to the output pressure of the pump for controlling the servomotor to cause the pump to operate as a variable displacement pump in one condition of operation, and locking means for locking the servomotor in a predetermined position to cause the pump to operate as a fixed displacement pump in a second condition of operation, said locking means including disabling means for disabling the servomotor control means, said disabling means including first valve means for shutting off the flow of pressurized fluid from the pump to the servomotor control means and second valve means for equalizing the fluid pressures in the chambers of the hydraulic servomotor.

2. A control as defined in claim 1 wherein the locking means include a shaft attached to the servo piston to hold the piston in a fixed position during the second condition of operation.

3. A control as defined in claim 2 wherein the locking means include a hydraulic motor having piston means for positioning the shaft in the second condition of operation.

4. A control for a hydraulic pump of the kind in which the displacement of the pump is varied by changing the angular position of a wobble plate and comprising, a hydraulic servomotor including a servo piston connected to the wobble plate, said servomotor having a fluid pressure chamber on each side of the servo piston, servomotor control means responsive to the output pressure of the pump for controlling the servomotor to cause the pump to operate as a variable displacement pump in one condition of operation, and locking means for locking the servomotor in a predetermined position to cause the pump to operate as a fixed displacement pump in a second condition of operation, said locking means including disabling means for disabling the servomotor control means by equalizing the fluid pressures in the chambers of the hydraulic servomotor, a shaft attached to the servo piston to hold the piston in a fixed position during the second condition of operation, a hydraulic motor having piston means for positioning the shaft in the second condition of operation and wherein the locking means include a fixed stop, the piston means include a first piston member connected to the shaft and a second floating piston member which engages the stop and stops movement of the first piston and shaft in the second condition of operation.

5. A control as defined in claim 4 wherein the connection between the shaft and the first piston member is a threaded connection which is adjustable to vary the position of the servo piston and thus the amount of the fixed output of the pump in the second condition of operation.

* * * * *